(12) United States Patent
Bonner et al.

(10) Patent No.: US 8,453,682 B2
(45) Date of Patent: Jun. 4, 2013

(54) COMPRESSED GAS DISPENSING METHOD

(75) Inventors: Brian Bernard Bonner, Nesquehoning, PA (US); Joseph Perry Cohen, Bethlehem, PA (US); David John Farese, Riegelsville, PA (US); Edward Clyde Heydorn, Macungie, PA (US); Ravi Subramanian, Allentown, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 404 days.

(21) Appl. No.: 12/785,761

(22) Filed: May 24, 2010

(65) Prior Publication Data

US 2011/0284120 A1 Nov. 24, 2011

(51) Int. Cl.
*B65B 31/00* (2006.01)

(52) U.S. Cl.
USPC .................. 141/4; 141/39; 141/47; 141/104; 137/113

(58) Field of Classification Search
USPC ........... 141/4, 39, 47, 104, 231, 197; 137/113
See application file for complete search history.

(56) References Cited

U.S. PATENT DOCUMENTS

| | | | |
|---|---|---|---|
| 2,968,162 A * | 1/1961 | Acomb | 62/48.1 |
| 4,139,019 A * | 2/1979 | Bresie et al. | 137/351 |
| 4,341,234 A * | 7/1982 | Meinass et al. | 137/110 |
| 4,380,242 A * | 4/1983 | Bresie et al. | 137/113 |
| 6,779,568 B2 | 8/2004 | Borck | |
| 6,786,245 B1 | 9/2004 | Eichelberger et al. | |
| 7,178,565 B2 | 2/2007 | Eichelberger et al. | |
| 7,775,245 B2 | 8/2010 | Gershtein et al. | |
| 2004/0118476 A1 | 6/2004 | Borck | |
| 2007/0079891 A1 | 4/2007 | Farese et al. | |
| 2008/0185068 A1 | 8/2008 | Cohen et al. | |
| 2009/0151809 A1 | 6/2009 | Balsubramanian et al. | |
| 2009/0236006 A1 | 9/2009 | Farese et al. | |
| 2009/0297897 A1 | 12/2009 | Boyd et al. | |

FOREIGN PATENT DOCUMENTS

| | | |
|---|---|---|
| CN | 101155748 A | 4/2008 |
| DE | 29 46 176 A1 | 5/1981 |
| EP | 1 777 454 A1 | 4/2007 |

* cited by examiner

*Primary Examiner* — Gregory Huson
*Assistant Examiner* — Jason K Niesz
(74) *Attorney, Agent, or Firm* — Bryan C. Hoke, Jr.

(57) ABSTRACT

A method for dispensing a compressed gas for reducing the amount of residual gas in dispensing station storage vessels before refilling is required. The method comprises transferring compressed gas into receiving vessels in a first series of fill-ups where each of the receiving vessels receive compressed gas from a first mobile storage device and subsequently from a second mobile storage device, transporting the first mobile storage device to a refilling station after the first mobile storage device has been depleted to a selected depletion level, refilling the first mobile storage device at the refilling station, and transferring compressed gas into receiving vessels in a second series of fill-ups where each of the receiving vessels receive compressed gas from the second mobile storage device and one or more of the first mobile storage device after refilling and a third mobile storage device.

12 Claims, No Drawings

COMPRESSED GAS DISPENSING METHOD

BACKGROUND

The present invention relates to a method for delivering a pressurized fluid, such as hydrogen or another compressed gas, to a receiving tank, such as a vehicle fuel tank. Although the invention is discussed herein with regard to delivery of pressurized hydrogen gas to fuel tanks of hydrogen-powered vehicles, persons skilled in the art will recognize that the invention has other applications. For example, it may be used to deliver other pressurized fluids which may or may not be used as fuels, and the pressurized fluids may be delivered to various types of receiving tanks other than vehicle fuel tanks.

With the increasing interest in clean and efficient fuels, automobile manufacturers are designing and manufacturing hydrogen-powered vehicles that are powered by fuel cells or hydrogen internal combustion engines. Hydrogen is being tested in these vehicles and has the potential to be the fuel of choice in the future. These hydrogen-powered vehicles are in the development stage and manufacturers are performing extensive tests to improve the vehicles and related technologies. Since there is not an established hydrogen fueling infrastructure in place, some manufacturers are installing fixed hydrogen fueling stations at test sites and elsewhere. Testing is taking place throughout North America without sufficient capability to fuel the test vehicles away from the fixed hydrogen fueling stations.

Hydrogen-powered vehicles are also being demonstrated and promoted at public events to increase consumer awareness and interest. These events are taking place at many locations where hydrogen fueling is needed but is not available. Currently, hydrogen is delivered to these events in the form of liquid or as a cylinder product. BX cylinders, individually or in packs, may be used to provide hydrogen to customers. However, these cylinders are very heavy and difficult (expensive) to transport.

In view of the above, there is a need to refill fixed hydrogen fueling stations and mobile hydrogen fueling stations to fuel test vehicles and demonstration vehicles at public events.

Industry desires to deliver compressed gas to hydrogen-fueled vehicles at high pressures (e.g. at pressures of 5,000 psig or more). As the delivery pressure requirements are increased, the amount of residual gas remaining in the hydrogen storage vessels at a conventional dispensing station is increased. One or more storage vessels at the dispensing station must have a pressure greater than the delivery pressure requirement. When none of the storage vessels can provide compressed gas at the delivery pressure requirement, the vessels must be refilled.

Industry desires to reduce the amount of residual gas in the storage vessels prior to refilling the storage vessels. This will reduce the frequency of refilling the storage vessels.

BRIEF SUMMARY

The present disclosure relates to a method for dispensing a compressed gas. The method is suitable for reducing the amount of residual gas in storage vessels of a mobile compressed gas storage device prior to refilling the storage vessels.

In a first aspect, the method comprises
(a) transferring the compressed gas into a first plurality of receiving vessels in a first series of fluid transfer events wherein each of the first plurality of receiving vessels receive the compressed gas from a first mobile compressed gas storage device comprising a first plurality of manifold-connected compressed gas storage vessels and subsequently receive the compressed gas from a second mobile compressed gas storage device comprising a second plurality of manifold-connected compressed gas storage vessels during each fluid transfer event of the series of fluid transfer events thereby depleting the first mobile compressed gas storage device and the second mobile compressed gas storage device of the compressed gas;
(b) transporting the first mobile compressed gas storage device to a refilling station after the first mobile compressed gas storage device has been depleted to a selected depletion level;
(c) refilling the first mobile compressed gas storage device at the refilling station; and
(d) transferring the compressed gas into a second plurality of receiving vessels in a second series of fluid transfer events wherein each of the second plurality of receiving vessels receive the compressed gas from the second mobile compressed gas storage device and subsequently receive the compressed gas from at least one of the first mobile compressed gas storage device after the refilling step and a third mobile compressed gas storage device during each fluid transfer event of the second series of fluid transfer events, the third mobile compressed gas storage device comprising a third plurality of manifold-connected compressed gas storage vessels.

In a second aspect, the method comprises a method of the first aspect wherein the compressed gas is hydrogen.

In a third aspect, the method comprises a method of any one of the preceding aspects wherein each of the second plurality of receiving vessels receive the compressed gas from the second mobile compressed gas storage device and subsequently receive the compressed gas from the first mobile compressed gas storage device after the refilling step during each fluid transfer event of the second series of fluid transfer events.

In a fourth aspect, the method comprises a method of any one of the first through third aspects wherein each of the second plurality of receiving vessels receive the compressed gas from the second mobile compressed gas storage device and subsequently receive the compressed gas from the third mobile compressed gas storage device during each fluid transfer event of the second series of fluid transfer events.

In a fifth aspect, the method comprises a method of any one of the preceding aspects wherein the compressed gas is transferred into the first plurality of receiving vessels without using mechanical compression during each fluid transfer event of the first series of fluid transfer events.

In a sixth aspect, the method comprises a method of any one of the preceding aspects wherein the compressed gas is transferred into the second plurality of receiving vessels without using mechanical compression during each fluid transfer event of the second series of fluid transfer events.

In a seventh aspect, the method comprises a method of any one of the preceding aspects wherein the first mobile compressed gas storage device is a self-contained mobile fueling station.

In an eighth aspect, the method comprises a method of any one of the preceding aspects wherein the second mobile compressed gas storage device is a tube trailer comprising the second plurality of manifold-connected compressed gas storage vessels or a skid comprising the second plurality of manifold-connected compressed gas storage vessels.

In a ninth aspect, the method comprises a method of any one of aspects 1, 2, and 4-8 wherein the third mobile compressed gas storage device is another self-contained mobile fueling station.

In a tenth aspect, the method comprises any one of the preceding aspects wherein each fluid transfer event in the first series of fluid transfer events comprises:
  transferring the compressed gas from at least one of the vessels of the first plurality of manifold-connected compressed gas storage vessels to at least one receiving vessel of the first plurality of receiving vessels without using mechanical compression;
  selecting a first criterion for the at least one receiving vessel of the first plurality of receiving vessels at which to discontinue transferring the compressed gas from the at least one of the vessels of the first plurality of manifold-connected compressed gas storage vessels to the at least one receiving vessel;
  discontinuing transfer of the compressed gas from the at least one of the vessels of the first plurality of manifold-connected compressed gas storage vessels to the at least one receiving vessel of the first plurality of receiving vessels when the first criterion is reached;
  continuing to dispense the compressed gas to the at least one receiving vessel of the first plurality of receiving vessels by transferring the compressed gas from at least one of the vessels of the second plurality of manifold-connected compressed gas storage vessels to the at least one receiving vessel of the first plurality of receiving vessels without using mechanical compression;
  selecting a second criterion for the at least one receiving vessel of the first plurality of receiving vessels at which to discontinue transferring the compressed gas from the at least one of the vessels of the second plurality of manifold-connected compressed gas storage vessels to the at least one receiving vessel of the first plurality of receiving vessels; and
  discontinuing transfer of the compressed gas from the at least one of the vessels of the second plurality of manifold-connected compressed gas storage vessels to the at least one receiving vessel of the first plurality of receiving vessels when the second criterion is reached.

In an eleventh aspect, the method comprises a method of any one of aspects 1, 2, and 4-10 wherein each fluid transfer event in the second series of fluid transfer events comprises:
  transferring the compressed gas from at least one of the vessels of the second plurality of manifold-connected compressed gas storage vessels to at least one receiving vessel of the second plurality of receiving vessels without using mechanical compression;
  selecting a third criterion for the at least one receiving vessel of the second plurality of receiving vessels at which to discontinue transferring the compressed gas from the at least one of the vessels of the second plurality of manifold-connected compressed gas storage vessels to the at least one receiving vessel of the second plurality of receiving vessels;
  discontinuing transfer of the compressed gas from the at least one of the vessels of the second plurality of manifold-connected compressed gas storage vessels to the at least one receiving vessel of the second plurality of receiving vessels when the third criterion is reached;
  continuing to dispense the compressed gas to the at least one receiving vessel of the second plurality of receiving vessels by transferring the compressed gas from at least one of the vessels of the third plurality of manifold-connected compressed gas storage vessels to the at least one receiving vessel of the second plurality of receiving vessels without using mechanical compression;
  selecting a fourth criterion for the at least one receiving vessel of the second plurality of receiving vessels at which to discontinue transferring the compressed gas from the at least one of the vessels of the third plurality of manifold-connected compressed gas storage vessels to the at least one receiving vessel of the second plurality of receiving vessels; and
  discontinuing transfer of the compressed gas from the at least one of the vessels of the third plurality of manifold-connected compressed gas storage vessels to the at least one receiving vessel of the second plurality of receiving vessels when the fourth criterion is reached.

In a twelfth aspect, the method comprises a method of any one of aspects 1-3, 5-8 and 10 wherein each fluid transfer event in the second series of fluid transfer events comprises:
  transferring the compressed gas from at least one of the vessels of the second plurality of manifold-connected compressed gas storage vessels to at least one receiving vessel of the second plurality of receiving vessels without using mechanical compression;
  selecting a fifth criterion for the at least one receiving vessel of the second plurality of receiving vessels at which to discontinue transferring the compressed gas from the at least one of the vessels of the second plurality of manifold-connected compressed gas storage vessels to the at least one receiving vessel of the second plurality of receiving vessels;
  discontinuing transfer of the compressed gas from the at least one of the vessels of the second plurality of manifold-connected compressed gas storage vessels to the at least one receiving vessel of the second plurality of receiving vessels when the fifth criterion is reached;
  continuing to dispense the compressed gas to the at least one receiving vessel of the second plurality of receiving vessels by transferring the compressed gas from at least one of the vessels of the first plurality of manifold-connected compressed gas storage vessels of the first mobile compressed gas storage device after the refilling step to the at least one receiving vessel of the second plurality of receiving vessels without using mechanical compression;
  selecting a sixth criterion for the at least one receiving vessel of the second plurality of receiving vessels at which to discontinue transferring the compressed gas from the at least one of the vessels of the first plurality of manifold-connected compressed gas storage vessels of the first mobile compressed gas storage device after the refilling step to the at least one receiving vessel of the second plurality of receiving vessels; and
  discontinuing transfer of the compressed gas from the at least one of the vessels of the first plurality of manifold-connected compressed gas storage vessels of the first mobile compressed gas storage device after the refilling step to the at least one receiving vessel of the second plurality of receiving vessels when the sixth criterion is reached.

DETAILED DESCRIPTION

The articles "a" and "an" as used herein mean one or more when applied to any feature in embodiments of the present invention described in the specification and claims. The use of "a" and "an" does not limit the meaning to a single feature unless such a limit is specifically stated. The article "the" preceding singular or plural nouns or noun phrases denotes a particular specified feature or particular specified features and may have a singular or plural connotation depending upon the context in which it is used. The adjective "any" means one, some, or all indiscriminately of whatever quantity.

As used herein, the term "plurality" means two or more.

Unless otherwise noted, all pressure values used herein are gauge pressures.

For the purposes of simplicity and clarity, detailed descriptions of well-known devices, circuits, and methods are omitted so as not to obscure the description of the present invention with unnecessary detail.

The present invention relates to a method for dispensing a compressed gas.

As used herein, the term "compressed gas" encompasses supercritical fluids and pressurized gases (gases at a pressure greater than 1 atm. (absolute) and less than the critical pressure of the gas or a temperature less than the critical temperature of the gas).

The compressed gas may be a single species or a mixture of species. The compressed gas may be hydrogen. The compressed gas may be natural gas.

The method comprises transferring the compressed gas into a first plurality of receiving vessels in a first series of fluid transfer events. The compressed gas may be transferred into the first plurality of receiving vessels without using mechanical compression during each fluid transfer event of the first series of fluid transfer events.

Receiving vessels may be any vessels suitable for receiving the compressed gas, for example vessels in cars, trucks, forklifts, or other vehicles which use the compressed gas. A first plurality of receiving vessels refers to a first group of two or more receiving vessels wherein each receiving vessel is part of a different vehicle.

A fluid transfer event is a distinct event where a fluid (i.e. the compressed gas) is transferred from one or more storage devices to one or more receiving vessels in a single occasion of continuous sitting. A fluid transfer event is analogous to a single fill-up of a gasoline-powered automobile at a gasoline filling station. In a series of fluid transfer events, fluid is transferred to multiple receiving vessels, at least some in a sequential manner.

During the first series of fluid transfer events, each of the first plurality of receiving vessels receive the compressed gas from a first mobile compressed gas storage device and subsequently receive the compressed gas from a second mobile compressed gas storage device during each fluid transfer event of the series of fluid transfer events. Since the transfer of compressed gas to the receiving vessels is sequential, i.e. first from the first mobile compressed gas storage device and subsequently from the second mobile compressed gas storage device, each of the first plurality of receiving vessels receive compressed gas from the first mobile compressed gas storage device up to an intermediate pressure and subsequently receive compressed gas from the second mobile compressed gas storage device up to a final fill pressure. For example, during a single fluid transfer event, if the target fill pressure for the receiving vessel is 40 MPa, the maximum pressure in the first mobile compressed gas storage device is 30 MPa, and the maximum pressure in the second mobile compressed gas storage device is 52 MPa, the receiving vessel may receive compressed gas from the first mobile compressed gas storage device up to 30 MPa and then receive compressed gas from the second mobile compressed gas storage device up to the final fill pressure of 40 MPa.

The first mobile compressed gas storage device and the second mobile compressed gas storage device become depleted of the compressed gas as the compressed gas is transferred. As used herein the terms "depleted" and "depleting" mean to lessen in quantity or content. "Depleting" does not require total or complete emptying the vessel of the compressed gas.

The first mobile compressed gas storage device may have previously been used for higher pressure fills and no longer suitable for higher pressure fills, but still may be suitable for providing compressed gas at lower pressures. Required higher pressure filling may be provided by the second mobile compressed gas storage device. The advantage of providing a lower pressure fill from the first mobile compressed gas storage device is reduced residual compressed gas in the compressed gas storage device prior to refilling and less frequent refilling of the mobile compressed gas storage devices.

A mobile compressed gas storage device is a device for storing compressed gas, wherein the device is suitable for transporting the compressed gas from place to place. A mobile compressed gas storage device is suitable for transporting compressed gas from place to place if, in fact, it is moved from place to place, for example to a first location where the mobile compressed storage device is refilled and then to a second location where the compressed gas is transferred to receiving vessels for end users.

The first mobile compressed gas storage device comprises a first plurality of manifold-connected compressed gas storage vessels. The second mobile compressed gas storage device comprises a second plurality of manifold-connected compressed gas storage vessels. The compressed gas storage vessels are manifold-connected, meaning that they are joined to a manifold that receives compressed gas from each of the compressed gas storage vessels of each respective mobile compressed gas storage device. The compressed gas storage vessels may be any suitable compressed gas storage vessel known in the art, including high pressure composite hydrogen tanks which can store hydrogen at pressures up to 70 MPa. Composite hydrogen tanks have been described by Quantum Technologies, Inc. and Lincoln Composites, a division of Advanced Technical Products, Inc.

The compressed gas storage vessels are connected in the sense that they are moved together when moved from place to place. Examples of mobile compressed gas storage devices include tube trailers, skids with compressed gas cylinders suitable for transport on a flat bed trailer, and self-contained mobiles fueling stations such as described in U.S. Pat. No. 6,786,245.

The first mobile compressed gas storage device and the second mobile compressed gas storage device are each separate and distinct from each other.

The first mobile compressed gas storage device may be a self-contained mobile fueling station such as that described in U.S. Pat. No. 7,178,565, incorporated herein in its entirety by reference. The first mobile compressed gas storage device may be a tube trailer. The first mobile compressed gas storage device may be a skid with compressed gas cylinders mounted on a flat bed trailer.

The second mobile compressed gas storage device may be a self-contained mobile fueling station. The second mobile compressed gas storage device may be a tube trailer. The second mobile compressed gas storage device may be a skid with compressed gas cylinders mounted on a flat bed trailer.

Each fluid transfer event in the first series of fluid transfer events may comprise: (a) transferring the compressed gas from at least one of the vessels of the first plurality of manifold-connected compressed gas storage vessels to at least one receiving vessel of the first plurality of receiving vessels; (b) selecting a first criterion for the at least one receiving vessel of the first plurality of receiving vessels at which to discontinue transferring the compressed gas from the at least one of the vessels of the first plurality of manifold-connected compressed gas storage vessels to the at least one receiving vessel; (c) discontinuing transfer of the compressed gas from the at least one of the vessels of the first plurality of manifold-connected compressed gas storage vessels to the at least one receiving vessel of the first plurality of receiving vessels when the first criterion is reached; (d) continuing to dispense the compressed gas to the at least one receiving vessel of the first plurality of receiving vessels by transferring the compressed gas from at least one of the vessels of the second plurality of manifold-connected compressed gas storage vessels to the at least one receiving vessel of the first plurality of receiving vessels; (e) selecting a second criterion for the at least one receiving vessel of the first plurality of receiving vessels at which to discontinue transferring the compressed gas from the at least one of the vessels of the second plurality of manifold-connected compressed gas storage vessels to the at least one receiving vessel of the first plurality of receiving vessels; and (f) discontinuing transfer of the compressed gas from the at least one of the vessels of the second plurality of manifold-connected compressed gas storage vessels to the at least one receiving vessel of the first plurality of receiving vessels when the second criterion is reached.

The first criterion may be any suitable criterion for triggering the switch between supplying the compressed gas from the first plurality of manifold-connected compressed gas storage vessels to supplying the compressed gas from the second plurality of manifold-connected compressed gas storage vessels. For example, the first criterion may be a target pressure in the receiving vessel optionally adjusted by the temperature of the compressed gas in the receiving vessel above which the switch is triggered. The first criterion may be a target pressure difference between the storage vessel and the receiving vessel where the switch is triggered when the pressure difference is less than the target pressure difference. The first criterion may be a target flow rate (for example 1 g/s) of compressed gas from the first plurality of manifold-connected compressed gas storage vessels below which the switch is triggered.

The second criterion may be any suitable criterion for triggering a stop to compressed gas dispensing. For example, the second criterion may be a target pressure in the receiving vessel optionally adjusted by the temperature of the compressed gas in the receiving vessel above which the switch is triggered. The second criterion may be a target pressure difference between the storage vessel and the receiving vessel where the switch is triggered when the pressure difference is less than the target pressure difference. The second criterion may be a target flow rate (for example 1 g/s) of compressed gas from the second plurality of manifold-connected compressed gas storage vessels below which the switch is triggered.

During a fluid transfer event, compressed gas may be transferred from more than one of the manifold-connected compressed gas storage vessel into a receiving vessel using cascade filling. Cascade filling is described, for example, in U.S. Pat. No. 6,779,568 and United States Patent Application Publication Nos. US 2007/079891 and US 2009/0151809.

The method also comprises transporting the first mobile compressed gas storage device to a refilling station after the first mobile compressed gas storage device has been depleted to a selected depletion level. After repeatedly transferring compressed gas from the first mobile compressed gas storage device into the first plurality of receiving vessels, the first mobile compressed gas storage device may become depleted to a point where it does not have a suitable amount of compressed gas available for filling any additional receiving vessels. The operator of the dispensing facility and/or compressed gas provider may select the depletion level below which mobile compressed gas storage devices are scheduled for refilling. A refilling station is any production and/or distribution center such as a transfill station and/or transfer station where the mobile compressed gas storage device may be suitably refilled with compressed gas.

The method also comprises refilling the first mobile compressed gas storage device at the refilling station. The first mobile compressed gas storage device may be returned to the location where it provided compressed gas to the first plurality of receiving vessels or it may be dispatched to another location.

The method also comprises transferring the compressed gas into a second plurality of receiving vessels in a second series of fluid transfer events. The compressed gas may be transferred into the second plurality of receiving vessels without using mechanical compression during each fluid transfer event of the second series of fluid transfer events.

A second plurality of receiving vessels refers to a second group of two or more receiving vessels wherein each receiving vessel is part of a different vehicle. The second plurality of receiving vessels may comprise one or more of the same receiving vessels as the first plurality of receiving vessels. The second plurality of receiving vessels may comprise different receiving vessels than the first plurality of receiving vessels.

Each of the second plurality of receiving vessels receive the compressed gas from the second mobile compressed gas storage device and subsequently receive the compressed gas from at least one of the first mobile compressed gas storage device after the refilling step and a third mobile compressed gas storage device during the vessels' respective fluid transfer event of the second series of fluid transfer events. Since the transfer of compressed gas to the receiving vessels is sequential during the second series of fluid transfer events, i.e. first from the second mobile compressed gas storage device and subsequently from at least one of the first mobile compressed gas storage device after the refilling step or the third mobile compressed gas storage device, each of the second plurality of receiving vessels receive a lower pressure fill from the second mobile compressed gas storage device and subsequently receive a higher pressure fill from the first mobile compressed gas storage device after the refilling step and/or the third mobile compressed gas storage device.

The third mobile compressed gas storage device comprises a third plurality of manifold-connected compressed gas storage vessels. The third mobile compressed gas storage device is separate and distinct from the first mobile compressed gas storage device and the second mobile compressed gas storage device.

The third mobile compressed gas storage device may be a self-contained mobile fueling station. The third mobile compressed gas storage device may be a tube trailer. The third mobile compressed gas storage device may be a skid with compressed gas cylinders mounted on a flat bed trailer. The third mobile compressed gas storage device may have been transported from the refilling station.

Each fluid transfer event in the second series of fluid transfer events may comprise: (a) transferring the compressed gas from at least one of the vessels of the second plurality of manifold-connected compressed gas storage vessels to at least one receiving vessel of the second plurality of receiving vessels; (b) selecting a third criterion for the at least one receiving vessel of the second plurality of receiving vessels at which to discontinue transferring the compressed gas from the at least one of the vessels of the second plurality of manifold-connected compressed gas storage vessels to the at least one receiving vessel of the second plurality of receiving vessels; (c) discontinuing transfer of the compressed gas from the at least one of the vessels of the second plurality of manifold-connected compressed gas storage vessels to the at least one receiving vessel of the second plurality of receiving vessels when the third criterion is reached; (d) continuing to dispense the compressed gas to the at least one receiving vessel of the second plurality of receiving vessels by transferring the compressed gas from at least one of the vessels of the third plurality of manifold-connected compressed gas storage vessels to the at least one receiving vessel of the second plurality of receiving vessels; (e) selecting a fourth criterion for the at least one receiving vessel of the second plurality of receiving vessels at which to discontinue transferring the compressed gas from the at least one of the vessels of the third plurality of manifold-connected compressed gas storage vessels to the at least one receiving vessel of the second plurality of receiving vessels; and (f) discontinuing transfer of the compressed gas from the at least one of the vessels of the third plurality of manifold-connected compressed gas storage vessels to the at least one receiving vessel of the second plurality of receiving vessels when the fourth criterion is reached.

The third criterion may be any suitable criterion for triggering the switch between supplying the compressed gas from the second plurality of manifold-connected compressed gas storage vessels to supplying the compressed gas from the third plurality of manifold-connected compressed gas storage vessels. For example, the third criterion may be a target pressure in the receiving vessel optionally adjusted by the temperature of the compressed gas in the receiving vessel above which the switch is triggered. The third criterion may be a target pressure difference between the storage vessel and the receiving vessel where the switch is triggered when the pressure difference is less than the target pressure difference. The third criterion may be a target flow rate (for example 1 g/s) of compressed gas from the second plurality of manifold-connected compressed gas storage vessels below which the switch is triggered. The third criterion may be the same as the first criterion but adjusted for the respective storage vessel and receiving vessel.

The fourth criterion may be any suitable criterion for triggering a stop to compressed gas dispensing. For example, the fourth criterion may be a target pressure in the receiving vessel optionally adjusted by the temperature of the compressed gas in the receiving vessel above which the switch is triggered. The fourth criterion may be a target pressure difference between the storage vessel and the receiving vessel where the switch is triggered when the pressure difference is less than the target pressure difference. The fourth criterion may be a target flow rate (for example 1 g/s) of compressed gas from the third plurality of manifold-connected compressed gas storage vessels below which the switch is triggered. The fourth criterion may be the same as the second criterion but adjusted for the respective storage vessel and receiving vessel.

Each fluid transfer event in the second series of fluid transfer events may comprise: (a) transferring the compressed gas from at least one of the vessels of the second plurality of manifold-connected compressed gas storage vessels to at least one receiving vessel of the second plurality of receiving vessels; (b) selecting a fifth criterion for the at least one receiving vessel of the second plurality of receiving vessels at which to discontinue transferring the compressed gas from the at least one of the vessels of the second plurality of manifold-connected compressed gas storage vessels to the at least one receiving vessel of the second plurality of receiving vessels; (c) discontinuing transfer of the compressed gas from the at least one of the vessels of the second plurality of manifold-connected compressed gas storage vessels to the at least one receiving vessel of the second plurality of receiving vessels when the fifth criterion is reached; (d) continuing to dispense the compressed gas to the at least one receiving vessel of the second plurality of receiving vessels by transferring the compressed gas from at least one of the vessels of the first plurality of manifold-connected compressed gas storage vessels of the first mobile compressed gas storage device after the refilling step to the at least one receiving vessel of the second plurality of receiving vessels; (e) selecting a sixth criterion for the at least one receiving vessel of the second plurality of receiving vessels at which to discontinue transferring the compressed gas from the at least one of the vessels of the first plurality of manifold-connected compressed gas storage vessels of the first mobile compressed gas storage device after the refilling step to the at least one receiving vessel of the second plurality of receiving vessels; and (f) discontinuing transfer of the compressed gas from the at least one of the vessels of the first plurality of manifold-connected compressed gas storage vessels of the first mobile compressed gas storage device after the refilling step to the at least one receiving vessel of the second plurality of receiving vessels when the sixth criterion is reached.

The fifth criterion may be any suitable criterion for triggering the switch between supplying the compressed gas from the second plurality of manifold-connected compressed gas storage vessels to supplying the compressed gas from at least one of the vessels of the first plurality of manifold-connected compressed gas storage vessels of the first mobile compressed gas storage device after the refilling step. For example, the fifth criterion may be a target pressure in the receiving vessel optionally adjusted by the temperature of the compressed gas in the receiving vessel above which the switch is triggered. The fifth criterion may be a target pressure difference between the storage vessel and the receiving vessel where the switch is triggered when the pressure difference is less than the target pressure difference. The fifth criterion may be a target flow rate (for example 1 g/s) of compressed gas from the first plurality of manifold-connected compressed gas storage vessels below which the switch is triggered. The fifth criterion may be the same as the first and/or third criterion but adjusted for the respective storage vessel and receiving vessel.

The sixth criterion may be any suitable criterion for triggering a stop to compressed gas dispensing. For example, the sixth criterion may be a target pressure in the receiving vessel optionally adjusted by the temperature of the compressed gas in the receiving vessel above which the switch is triggered. The sixth criterion may be a target pressure difference between the storage vessel and the receiving vessel where the switch is triggered when the pressure difference is less than the target pressure difference. The sixth criterion may be a target flow rate (for example 1 g/s) of compressed gas from the first plurality of manifold-connected compressed gas storage vessels below which the switch is triggered. The sixth criterion may be the same as the second and/or fourth criterion but adjusted for the respective storage vessel and receiving vessel.

EXAMPLES

Example 1

Comparative Example

A plurality manifold-connected compressed gas storage vessels having 4 cascade banks of hydrogen composite tanks holds 781 kg of hydrogen at 43.0 MPa. A plurality of receiving vessels having an initial pressure of 2.86 MPa are filled to a final pressure of 34.6 MPa from the 4 cascade banks without any mechanical compression. 330 kg of hydrogen is transferred corresponding to a 42% utilization of the compressed hydrogen initially in the 4 cascade banks.

Example 2

A first plurality of manifold-connected compressed gas storage vessels having 4 cascade banks of hydrogen composite tanks and second plurality of manifold-connected compressed gas storage vessels having 4 cascade banks of hydrogen composite tanks each hold 781 kg of hydrogen at 43.0 MPa. A plurality of receiving vessels having an initial pressure of 2.86 MPa are filled to a final pressure of 34.6 MPa according the method disclosed herein without any mechanical compression. 629 kg of hydrogen is transferred from the first plurality of manifold-connected compressed gas storage vessels having 4 cascade banks corresponding to a 80% utilization of the compressed hydrogen initially in the 4 cascade banks.

Example 3

Comparative Example

A plurality manifold-connected compressed gas storage vessels having 4 cascade banks of hydrogen composite tanks holds 781 kg of hydrogen at 43.0 MPa. A plurality of receiving vessels having an initial pressure of 2.86 MPa are filled to a final pressure of 24.2 MPa from the 4 cascade banks without any mechanical compression. 475 kg of hydrogen is transferred corresponding to a 61% utilization of the compressed hydrogen initially in the 4 cascade banks.

Example 4

A plurality of manifold-connected compressed gas storage vessels having 4 cascade banks of hydrogen composite tanks and another plurality of manifold-connected compressed gas storage vessels having 4 cascade banks of hydrogen composite tanks each hold 781 kg of hydrogen at 43.0 MPa. A plurality of receiving vessels having an initial pressure of 2.86 MPa are filled to a final pressure of 24.2 MPa according the method disclosed herein without any mechanical compression. 704 kg of hydrogen is transferred from one of the 4 cascade bank systems corresponding to a 90% utilization of the compressed hydrogen initially in the 4 cascade banks.

The present method allows for unique optimization of the cost of dispensing stations, since no compression is required for 250 bar or 350 bar fueling. Also, when the cost of the mobile storage vessels is included in the cost of hydrogen, lower unit costs can be achieved through this method of delivery.

Although the present invention has been described as to specific embodiments or examples, it is not limited thereto, but may be changed or modified into any of various other forms without departing from the scope of the invention as defined in the accompanying claims.

The invention claimed is:

1. A method for dispensing a compressed gas, the method comprising:
   (a) transferring the compressed gas into a first plurality of receiving vessels in a first series of fluid transfer events wherein each of the first plurality of receiving vessels receive the compressed gas from a first mobile compressed gas storage device comprising a first plurality of manifold-connected compressed gas storage vessels and subsequently receive the compressed gas from a second mobile compressed gas storage device comprising a second plurality of manifold-connected compressed gas storage vessels during each fluid transfer event of the series of fluid transfer events thereby depleting the first mobile compressed gas storage device and the second mobile compressed gas storage device of the compressed gas, wherein each receiving vessel of the first plurality of receiving vessels is part of a different vehicle;
   (b) transporting the first mobile compressed gas storage device to a refilling station after the first mobile compressed gas storage device has been depleted to a selected depletion level;
   (c) refilling the first mobile compressed gas storage device at the refilling station; and
   (d) transferring the compressed gas into a second plurality of receiving vessels in a second series of fluid transfer events wherein each of the second plurality of receiving vessels receive the compressed gas from the second mobile compressed gas storage device and subsequently receive the compressed gas from at least one of the first mobile compressed gas storage device after the refilling step and a third mobile compressed gas storage device during each fluid transfer event of the second series of fluid transfer events, the third mobile compressed gas storage device comprising a third plurality of manifold-connected compressed gas storage vessels.

2. The method of claim 1 wherein the compressed gas is hydrogen.

3. The method of claim 1 wherein each of the second plurality of receiving vessels receive the compressed gas from the second mobile compressed gas storage device and subsequently receive the compressed gas from the first mobile compressed gas storage device after the refilling step during each fluid transfer event of the second series of fluid transfer events.

4. The method of claim 1 wherein each of the second plurality of receiving vessels receive the compressed gas from the second mobile compressed gas storage device and subsequently receive the compressed gas from the third mobile compressed gas storage device during each fluid transfer event of the second series of fluid transfer events.

5. The method of claim 1 wherein the compressed gas is transferred into the first plurality of receiving vessels without using mechanical compression during each fluid transfer event of the first series of fluid transfer events.

6. The method of claim 1 wherein the compressed gas is transferred into the second plurality of receiving vessels without using mechanical compression during each fluid transfer event of the second series of fluid transfer events.

7. The method of claim 1 wherein the first mobile compressed gas storage device is a self-contained mobile fueling station.

8. The method of claim 7 wherein the second mobile compressed gas storage device is a tube trailer comprising the second plurality of manifold-connected compressed gas storage vessels or a skid comprising the second plurality of manifold-connected compressed gas storage vessels.

9. The method of claim 8 wherein the third mobile compressed gas storage device is another self-contained mobile fueling station.

10. The method of claim 1 wherein each fluid transfer event in the first series of fluid transfer events comprises:

transferring the compressed gas from at least one of the vessels of the first plurality of manifold-connected compressed gas storage vessels to at least one receiving vessel of the first plurality of receiving vessels without using mechanical compression;

selecting a first criterion for the at least one receiving vessel of the first plurality of receiving vessels at which to discontinue transferring the compressed gas from the at least one of the vessels of the first plurality of manifold-connected compressed gas storage vessels to the at least one receiving vessel;

discontinuing transfer of the compressed gas from the at least one of the vessels of the first plurality of manifold-connected compressed gas storage vessels to the at least one receiving vessel of the first plurality of receiving vessels when the first criterion is reached;

continuing to dispense the compressed gas to the at least one receiving vessel of the first plurality of receiving vessels by transferring the compressed gas from at least one of the vessels of the second plurality of manifold-connected compressed gas storage vessels to the at least one receiving vessel of the first plurality of receiving vessels without using mechanical compression;

selecting a second criterion for the at least one receiving vessel of the first plurality of receiving vessels at which to discontinue transferring the compressed gas from the at least one of the vessels of the second plurality of manifold-connected compressed gas storage vessels to the at least one receiving vessel of the first plurality of receiving vessels; and discontinuing transfer of the compressed gas from the at least one of the vessels of the second plurality of manifold-connected compressed gas storage vessels to the at least one receiving vessel of the first plurality of receiving vessels when the second criterion is reached.

11. The method of claim 10 wherein each fluid transfer event in the second series of fluid transfer events comprises:

transferring the compressed gas from at least one of the vessels of the second plurality of manifold-connected compressed gas storage vessels to at least one receiving vessel of the second plurality of receiving vessels without using mechanical compression;

selecting a third criterion for the at least one receiving vessel of the second plurality of receiving vessels at which to discontinue transferring the compressed gas from the at least one of the vessels of the second plurality of manifold-connected compressed gas storage vessels to the at least one receiving vessel of the second plurality of receiving vessels;

discontinuing transfer of the compressed gas from the at least one of the vessels of the second plurality of manifold-connected compressed gas storage vessels to the at least one receiving vessel of the second plurality of receiving vessels when the third criterion is reached;

continuing to dispense the compressed gas to the at least one receiving vessel of the second plurality of receiving vessels by transferring the compressed gas from at least one of the vessels of the third plurality of manifold-connected compressed gas storage vessels or from at least one of the vessels of the first plurality of manifold-connected compressed gas storage vessels of the first mobile compressed gas storage device after the refilling step to the at least one receiving vessel of the second plurality of receiving vessels without using mechanical compression;

selecting a fourth criterion for the at least one receiving vessel of the second plurality of receiving vessels at which to discontinue transferring the compressed gas from the at least one of the vessels of the third plurality of manifold-connected compressed gas storage vessels or from at least one of the vessels of the first plurality of manifold-connected compressed gas storage vessels of the first mobile compressed gas storage device after the refilling step to the at least one receiving vessel of the second plurality of receiving vessels; and discontinuing transfer of the compressed gas from the at least one of the vessels of the third plurality of manifold-connected compressed gas storage vessels or from at least one of the vessels of the first plurality of manifold-connected compressed gas storage vessels of the first mobile compressed gas storage device after the refilling step to the at least one receiving vessel of the second plurality of receiving vessels when the fourth criterion is reached.

12. The method of claim 1 wherein each of the first plurality of receiving vessels receive the compressed gas from the first mobile compressed gas storage device up to an intermediate pressure and subsequently receive the compressed gas from the second mobile compressed gas storage device up to a final fill pressure.

* * * * *